(12) United States Patent
Newell et al.

(10) Patent No.: US 12,179,642 B2
(45) Date of Patent: Dec. 31, 2024

(54) VEHICLE SEAT

(71) Applicant: Thompson Aero Seating Limited, Portadown (GB)

(72) Inventors: Keith Robert Newell, Moneymore (GB); Neil Rodgers, Kilkeel (GB)

(73) Assignee: Thompson Aero Seating Limited, Portadown (GB)

( * ) Notice: Subject to any disclaimer, the term of this patent is extended or adjusted under 35 U.S.C. 154(b) by 0 days.

(21) Appl. No.: 17/872,216

(22) Filed: Jul. 25, 2022

(65) Prior Publication Data

US 2023/0056162 A1 Feb. 23, 2023

(30) Foreign Application Priority Data

Aug. 20, 2021 (GB) ..................................... 2111985

(51) Int. Cl.
*B64D 11/06* (2006.01)
*B60N 2/22* (2006.01)
*B60N 2/64* (2006.01)

(52) U.S. Cl.
CPC ............... *B60N 2/22* (2013.01); *B60N 2/646* (2013.01); *B64D 11/0641* (2014.12)

(58) Field of Classification Search
CPC ..... B60N 2/646; B60N 2/643; B64D 11/0641
See application file for complete search history.

(56) References Cited

U.S. PATENT DOCUMENTS

| | | | |
|---|---|---|---|
| 4,589,695 A | 5/1986 | Isono | |
| 5,076,643 A | 12/1991 | Colasanti | |
| 5,092,654 A | 3/1992 | Inaba | |
| 5,485,976 A | 1/1996 | Creed | |
| 10,118,704 B2 * | 11/2018 | Velasco | ................ B60N 2/7011 |
| 10,189,570 B2 * | 1/2019 | Hames | ...................... A47C 7/20 |
| 10,625,863 B2 * | 4/2020 | Jussli | ................. B64D 11/0631 |
| 2002/0060485 A1 * | 5/2002 | Fischer | .................. B60N 2/646 |
| | | | 297/284.4 |
| 2007/0114832 A1 | 5/2007 | Voigt | |
| 2010/0207443 A1 | 8/2010 | Brncick | |
| 2010/0244504 A1 | 9/2010 | Colja | |
| 2011/0233980 A1 | 9/2011 | Hoshi | |
| 2017/0066350 A1 * | 3/2017 | Dry | .......................... B60N 2/64 |
| 2018/0105274 A1 | 4/2018 | Udriste | |
| 2018/0326880 A1 * | 11/2018 | Sweeting | ............... B60N 2/646 |
| 2019/0184870 A1 * | 6/2019 | Clark | ..................... B60N 2/646 |

FOREIGN PATENT DOCUMENTS

| | | |
|---|---|---|
| DE | 3607258 A1 | 9/1987 |
| GB | 2206787 A | 1/1989 |

OTHER PUBLICATIONS

Search Report dated Jan. 27, 2022 in corresponding application GB2111985.4.

* cited by examiner

*Primary Examiner* — Timothy J Brindley
(74) *Attorney, Agent, or Firm* — Vitale, Vickrey, Siro, Solon & Gasey LLP

(57) ABSTRACT

A vehicle seat 10 comprising a seat base 11 and a backrest portion 13, wherein the backrest portion comprises a support structure 13. A user engagable cushioned section 14 is locatable on a user facing side 16 of the support structure 13 and the support structure 13 is shaped and dimensioned to receive at least a portion 21 of the cushioned section 14 such that the cushioned section comprises at least one localised area of increased thickness 15.

16 Claims, 5 Drawing Sheets

VEHICLE SEAT

FIELD OF THE INVENTION

This invention relates to a vehicle seat, and in particular to a vehicle seat comprising additional cushioning.

BACKGROUND OF THE INVENTION

It is known to provide a vehicle seat, such as an aircraft seat, with padding or cushioning to improve comfort. This typically takes the form of a layer of cushioning material which extends across a support frame of a seat base or a seat backrest. Increasing the thickness of the layer of cushioning material provided on a seat can greatly increase the comfort level experienced by a user seated thereon. This can be even more pertinent where the seat is a reclining seat, such as a reclining aircraft seat, wherein in the reclined position a passenger typically attempts to sleep upon the reclined seat and as such increased comfort is of even greater importance. This is exacerbated by the fact that particular areas of a passengers body may apply additional pressure when in a sleeping position, for example should a passenger be sleeping on their side, the shoulder will transfer a significant amount of the weight of the upper body to the reclined backrest of the seat and the point of transfer of this weight results in discomfort if the cushioning in this area is insufficient. However, in known seating designs, in order to increase the thickness of the cushioning and resulting comfort levels, the entire layer of cushioning material is typically thickened. Resultantly, this either increases the overall dimensions of the seat, or requires major reconfiguration of the support structure of the seat. Even should one location of the layer of cushioning material be thickened, it still results in a larger seat at that locality.

It is desirable to provide a vehicle seat comprising additional cushioning whilst not significantly increasing the overall size of the vehicle seat.

SUMMARY OF THE INVENTION

According to the invention there is provided a vehicle seat comprising a seat base and a backrest portion, wherein the backrest portion comprises: a support structure; a user engagable cushioned section locatable on a user facing side of the support structure; wherein the support structure is shaped and dimensioned to receive at least a portion of the cushioned section such that the cushioned section comprises at least one localised area of increased thickness.

Ideally, the vehicle seat is a reclining seat.

Advantageously, the at least one localised area of increased thickness provides additional comfort to a user seated upon on the vehicle seat, or in the case of a reclining seat lying upon the reclined seat.

Preferably, the support structure is shaped to define a cavity in the user facing side thereof.

Ideally, the cavity defines an opening thereinto from the user facing side of the support structure.

Ideally, the support structure extends between the user facing side thereof to a rear end thereof, the depth of the support structure being defined between the user facing side and the rear end.

Preferably, the cavity is shaped and dimensioned such that the presence thereof does not increase the depth of the support structure.

Ideally, the cavity defines an opening on the user facing side of the support structure.

Preferably, the cushioned section is sized and dimensioned such that at least a portion thereof extends into the cavity of the support structure to form a localised area of increased thickness.

Ideally, the cushioned section comprises a plurality of cushioned portions, at least one cushioned portion being sized and dimensioned such that at least a portion thereof extends into the cavity of the support structure to form a localised area of increased thickness.

Advantageously, the formation of a cavity without increasing the depth of the support structure, and placement of at least a portion of the cushioned section therein, allows for increased thickness of cushioning providing greater comfort without increasing the overall dimensions of the backrest portion.

Ideally, the vehicle seat is a reclining vehicle seat such that the backrest portion is movable between a seated configuration and a sleeping/reclining configuration.

Preferably, the seat base and backrest portion forms a generally flat sleeping surface in sleeping configuration such that a user may adopt a sleeping position.

Ideally, the cavity is sized and positioned such that the portion of the cushioned section therein provides additional support to a user when in the sleeping position.

Most ideally, the cavity is sized and positioned such that the portion of the cushioned section therein provides additional support to a user when in the sleeping position and sleeping on their side, the cavity being aligned with the shoulder of a user lying on their side on the reclined seat.

Preferably, the backrest portion comprises a width-wise dimension which extends, in use, generally across the width of the back of a user seated upon the seat.

Ideally, the backrest portion comprises a lengthwise dimension which extends, in use, generally longitudinally along the back of a user seated upon the seat.

Preferably, the cavity is formed centrally in the support structure with respect to the width-wise dimension thereof and extends at least partially along the lengthwise dimension.

Ideally, the cavity only extends partially along width-wise dimension.

Preferably, the cavity extends along substantially all of the lengthwise dimension of the backrest portion.

Ideally, the cushioned section comprises a stepped profile when viewed in cross section in the width-wise dimension.

Preferably, the stepped profile comprises a first portion of the cushioned section which extends across the entire width-wise dimension of the backrest portion, and a second portion of cushioned section, locatable on a support structure facing side of the first portion and centrally in relation to the width-wise dimension of the first portion, and which extends only partially along the backrest in the width-wise dimension.

Ideally, the second portion of cushioning section extends either side of the width-wise center of the first portion.

Ideally, the second portion of cushioned section extends from the first portion of cushioned section, into the cavity, and towards the rear end of the support structure.

Preferably, the size and shape of the second portion of cushioning section is substantially the same as the size and shape of the cavity such that the second portion pf cushioning section may be received into said cavity.

Ideally, the top and/or bottom longitudinal end of the cavity is a tapered end such that the cavity tapers away from the user facing side of the backrest portion.

Preferably, the cavity extends approximately 250-350 mm in the width-wise dimension.

Most preferably, the cavity extends approximately 303 mm in the width-wise dimension.

Ideally, the cavity extends approximately 500-600 mm in the lengthwise dimension.

Most preferably, the cavity extends approximately 530 mm in the lengthwise dimension.

Preferably, the cushioned section comprises a padded cushion.

Ideally the padded cushion comprises stuffing or padding material within a fabric covering.

Preferably, the cushioned section may further comprise an adjustable cushion section.

Ideally, the adjustable cushion section may be selectably inflated or deflated to permit adjustment of the level of cushioning felt by a user.

Preferably, the adjustable cushion section is a pneumatic cushion which is sized and dimensioned such that, when inflated, it expands from the cavity towards the user facing side of the vehicle seat.

Ideally, the pneumatic cushion is in operable engagement with a pneumatic system comprising an air source, an air outlet valve, and a user operable control arranged to permit user inflation and deflation of the pneumatic cushion via control of the air source and air outlet valve.

Preferably, the vehicle seat is a reclining aircraft passenger seat.

Most preferably. the vehicle seat is a reclining aircraft first class or business class passenger seat.

According to a second aspect of the invention there is provided a method of manufacturing a vehicle seat comprising the steps of: providing a seat base and a backrest portion, the backrest portion comprising a support structure shaped and sized to receive at least a portion of a cushioning section; forming a cushioning section having a localised area of increased thickness; and fitting the cushioning section to a user facing side of the support structure.

Ideally, the method further comprising the steps of: forming the support structure comprising a cavity in a user facing side thereof; and fitting the cushioning section to the user facing side of the support structure such that at least a portion of the cushioning section extends into the cavity of the support structure.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
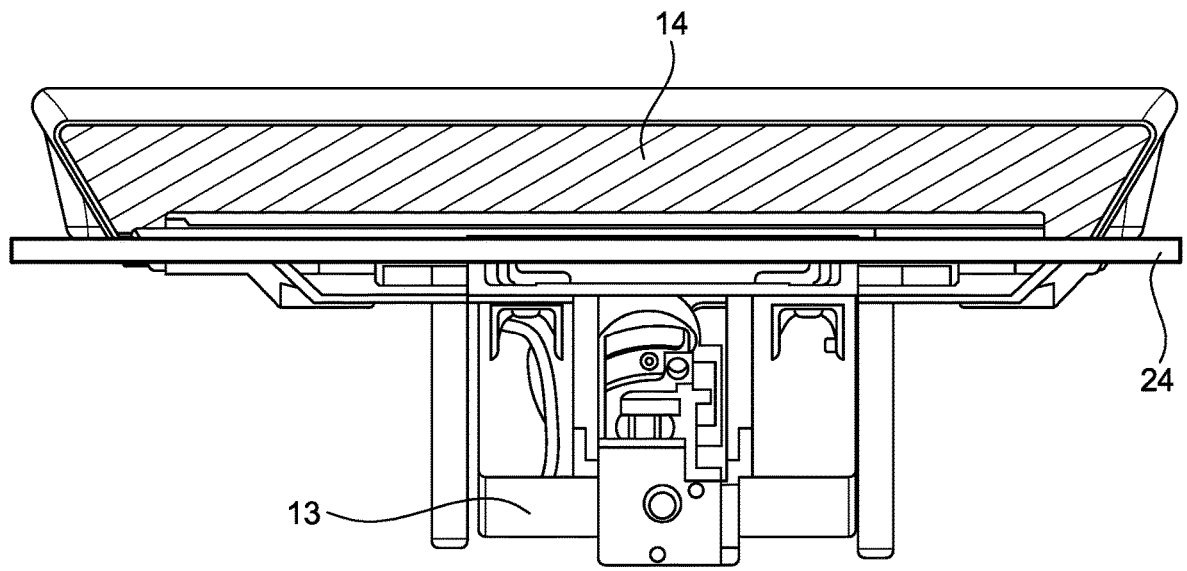
FIG. 1 is a sectional view of a prior art vehicle seat comprising padding having a generally straight rear profile.

The present teaching will now be described with reference to an exemplary vehicle seat. It will be understood that the exemplary vehicle seat is provided to assist in an understanding of the present teaching and is not to be construed as limiting in any fashion. Furthermore, elements or components that are described with reference to any one Figure may be interchanged with those of other Figures or other equivalent elements without departing from the spirit of the present teaching.

Referring now to the Figures, there is illustrated a vehicle seat 10. The vehicle seat as shown in the Figures is an aircraft passenger seat 10. The seat 10 comprises a seat base 11 and a backrest portion 12. In use, the seat base is sat upon by a user and their back rests upon the backrest portion. As can be seen from FIGS. 3 to 6 in particular, in the embodiments of the drawings the seat 10 is a reclining seat 10 which may recline to a substantially fully flat configuration such that the seat base 11 and backrest portion 12 form a generally flat surface for lying upon. The backrest portion 12 comprises a support structure 13. The support structure 13 retains the backrest in position, supports the weight of a user seated or lying on the seat 10, provides for connection to the seat base 11, and acts to house various systems and ancillary components of the seat 10. A user engagable cushioned section 14 is locatable on a user facing side of the support structure 13. The user facing side is that facing a user when said user is seated or lying on the seat 10. The cushioned section 14 comprises at least one localised area of increased thickness 15 which provides additional comfort to a user seated upon on the vehicle seat 10, or in the case of a reclining seat lying upon the reclined seat 10.

Figure 2:
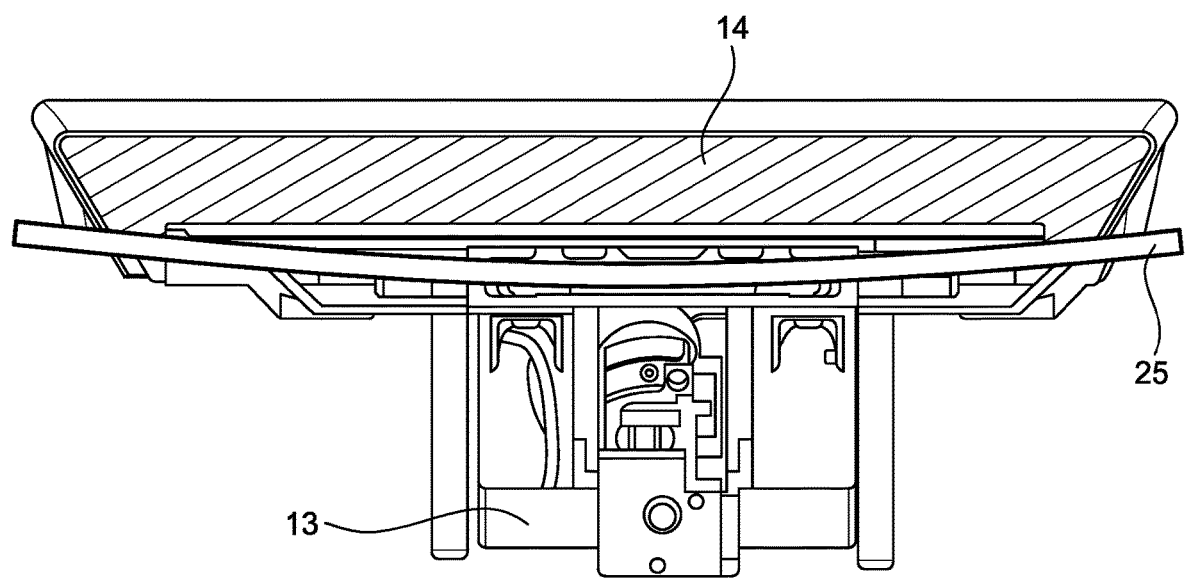
FIG. 2 is a sectional view of a prior art vehicle seat comprising padding having a generally curved rear profile.
Figure 3:
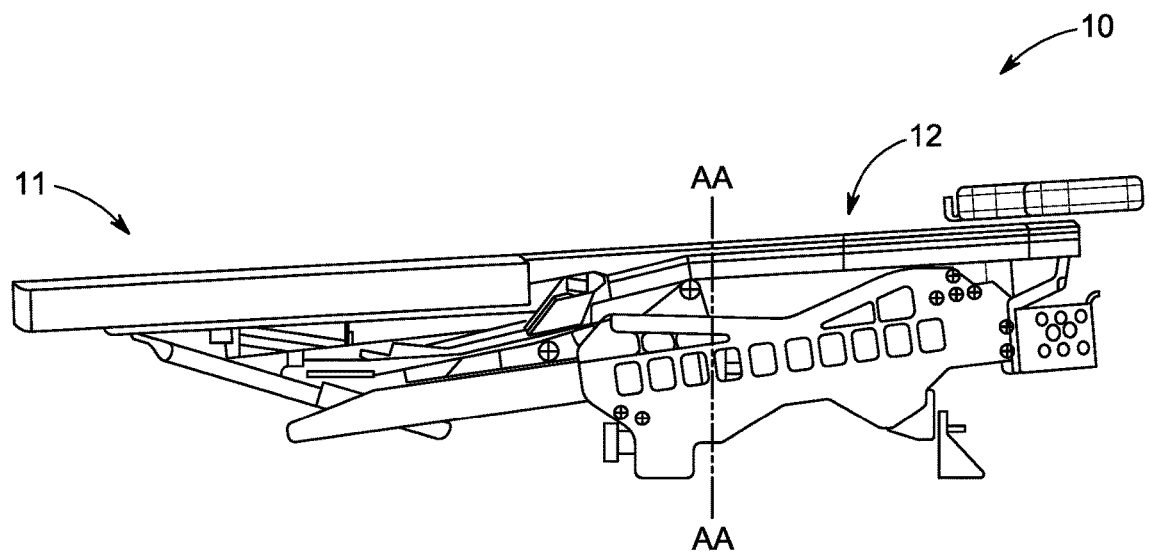
FIG. 3 is a side view of a vehicle seat.

The support structure 13 extends between the user facing side thereof 16 to a rear end 17 thereof, the depth of the support structure 13 being defined between the user facing side 16 and the rear end 16. The support structure 13 is shaped to define a cavity 18 in the user facing side thereof. By cavity, it is meant that the existing structure is adapted to provide a space or void in the support structure 13. The term cavity is intended to be non-limiting in such that the walls of the cavity may comprise gaps or the like. The cavity 18 is shaped and dimensioned such that the presence thereof does not increase the depth of the support structure 13, and therefore does not increase the overall depth of the backrest portion 12. This is achieved by forming existing material of the support structure and components thereof around the cavity 18. The cavity defines an opening 19 on the user facing side 16 of the support structure 13 such that when a cushioned section 14 is positioned on said user facing side 16 of the support structure at least a portion of the cushioning section may extend into the cavity 18. The cushioned section 14 is sized and dimensioned such that at least a portion thereof extends into the cavity 18 of the support structure 13 to form a localised area of increased thickness 15. In some embodiments, the cushioned section 14 comprises a plurality of cushioned portions 20, 21, at least one cushioned portion 21 being sized and dimensioned such that it extends into the cavity 18 of the support structure to form a localised area of increased thickness 15. Advantageously, the formation of a cavity 18 without increasing the depth of the support structure, and placement of at least a portion of the cushioned section 14 therein, allows for increased thickness of cushioning at the location of the cavity 18 providing greater comfort in this area without increasing the overall dimensions of the backrest portion 12. This is in contrast to prior art designs wherein all of the cushioning section is located on the user facing side of the backrest portion, or more specifically none of the cushioning is located within the body of the support structure as in the present invention. This can be seen in FIGS. 1 and 2 wherein FIG. 1 shows a prior art backrest portion having a straight profile cushioned section and FIG. 2 shows a prior art backrest portion having a curved profile cushioned section. The straight and curved profiles are depicted by the lines 24 and 25 respectively. In such prior art arrangements, to increase the thickness of the cushioning the entire cushioning layer must be increased in thickness, thus increasing the overall dimensions of the backrest portion, which in a space critical environment such as an aircraft cabin is not desirable. Even if the layer was increased in thickness locally, this thickness increase would increase the thickness of the backrest in this locality.

As noted above, the vehicle seat 10 is a reclining vehicle seat 10 such that the backrest portion 12 is movable between a seated configuration and a reclining/sleeping configuration. The drawings show only the sleeping configuration, see FIGS. 3 to 6 in particular. The seat base 11 and backrest portion 13 forms a generally flat sleeping surface in sleeping configuration such that a user may adopt a sleeping position. The cavity 18 is sized and positioned such that the portion of the cushioned section 21 therein provides additional support to a user when in the sleeping position. The positioning of the cavity 18 and associated portion of cushioned section 21 therein is particularly advantageous in supporting a user sleeping on the seat 10 on their side wherein the weight of the user is transferred through one of the users shoulders rather than distributed by the larger surface area of the users back or front when laying on their back or front. The positioning of the cavity 18, and cushioning portion 21 that is received thereinto, therefore provides for increased thickness in the area of the shoulder of a user when the user is lying on their side, and thus increased comfort to the user.

The backrest portion 12 comprises a width-wise dimension 22 which extends, in use, generally across the width of the back of a user, and a lengthwise dimension 23 which extends, in use, generally longitudinally along the back of a user. The cavity is formed centrally in the support structure 13 with respect to the width-wise dimension 22 and extends only partially along width-wise dimension each side of said width-wise center. In the embodiment shown in the drawings, the cavity 18 extends along the majority of the lengthwise dimension 23 of the backrest portion 12. It should be noted that the dimensions of the cavity 18 and portion 21 of cushioned section therein as shown in the drawings is for illustration only, and represents a preferable arrangement. It should be understood that the cavity 18 and associated portion 21 of cushioned section could take any reasonable size. It should also be noted that, should other localised areas of increased cushioning thickness be desired, that additional or alternative cavities of differing position and size may be created. In addition, whilst this application refers to providing localised additional thickness of cushioning in the backrest without increasing the backrest dimension, the same principle could be applied to the seat base. As such references herein to the cavity being in the backrest and the cushioning extending into the cavity in the backrest could equally apply to the formation of a cavity in the seat base and cushioning extending into the cavity in the seat base.

Figure 4:
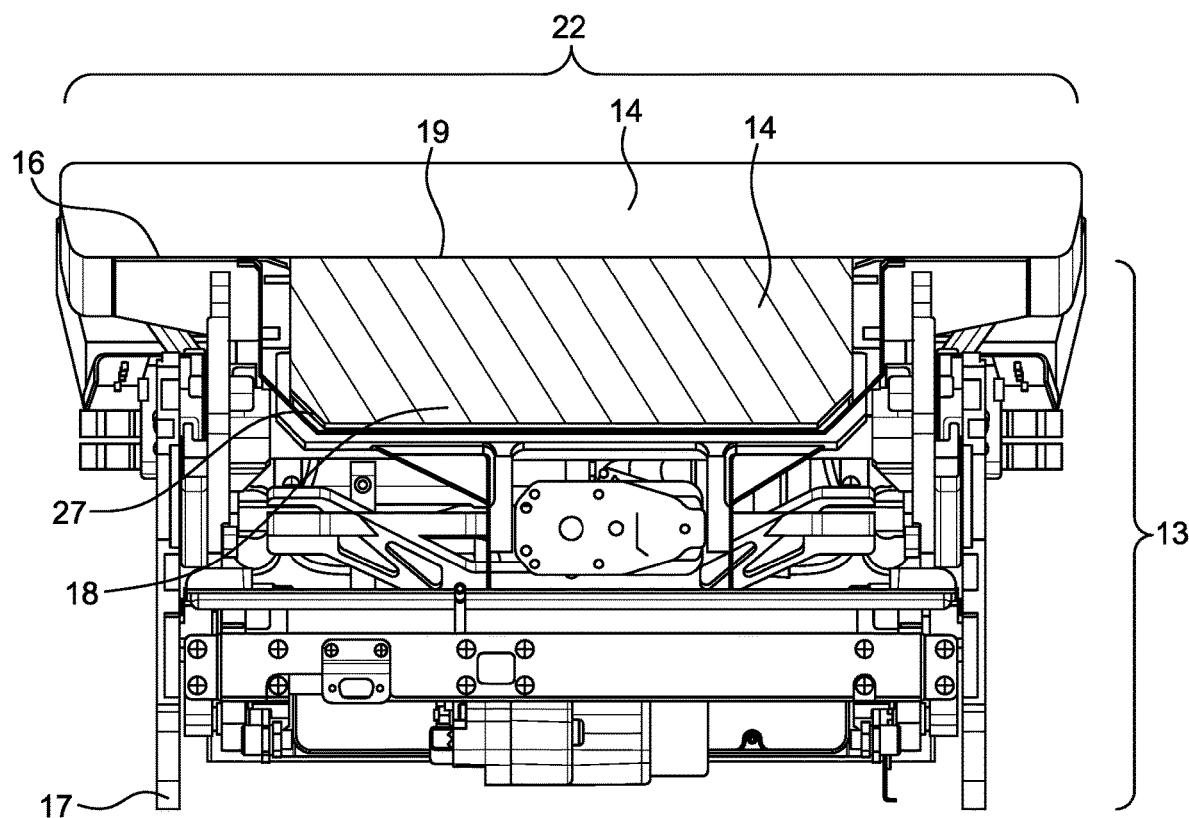
FIG. 4 is a sectional view of section AA of FIG. 3.
Figure 5:
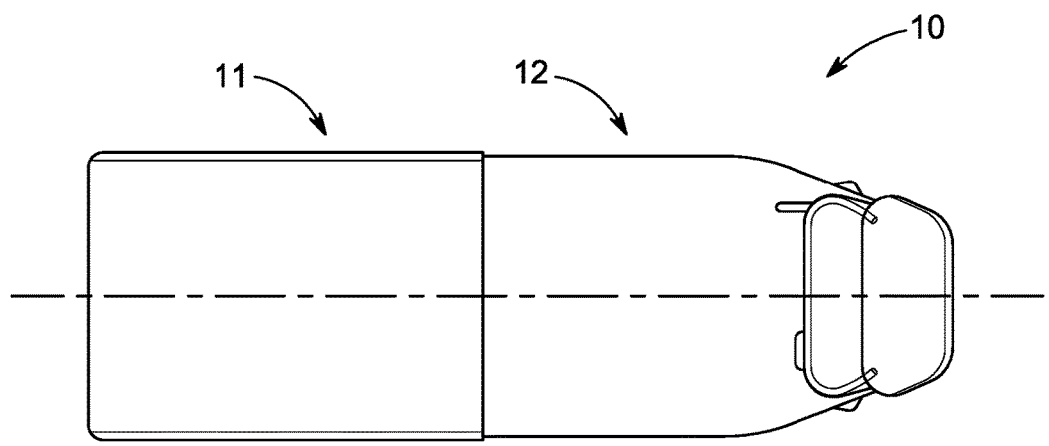
FIG. 5 is a plan view of the vehicle seat of FIG. 3.
Figure 6:
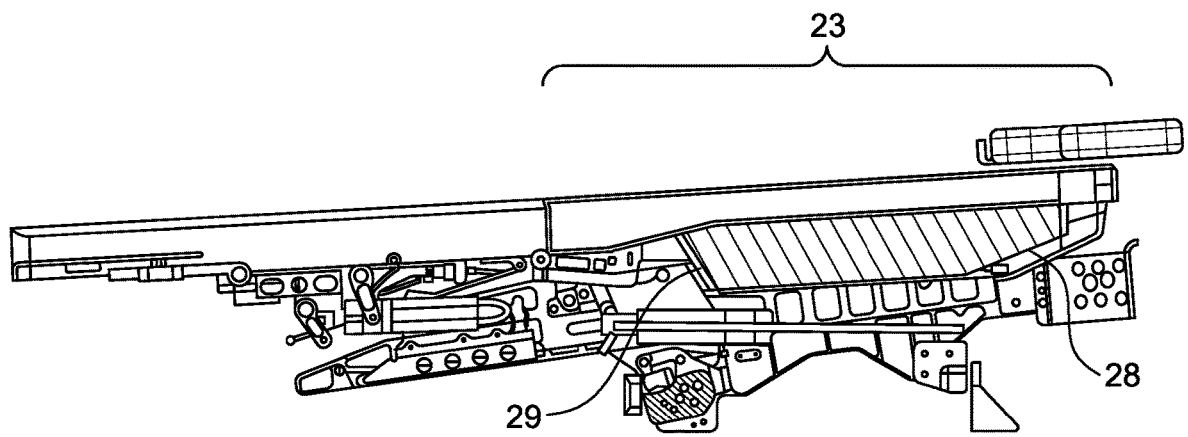
FIG. 6 is a sectional view of section BB of FIG. 5.
Figure 7:
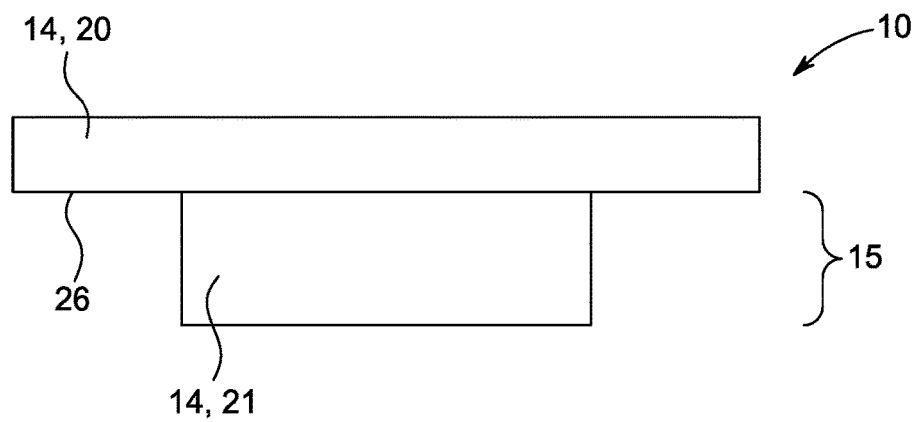
FIG. 7 is a sectional view of a cushioning section of a vehicle seat.

As is best seen in FIG. 4, the cushioned section 14 comprises a stepped profile when viewed in cross section in the width-wise dimension. The stepped profile comprises a first portion 20 of the cushioned section which extends across the entire width-wise dimension 22 of the backrest portion 12, and a second portion of cushioned section 21, locatable on a support structure facing side 26 of the first portion 20, and centrally in relation to the width-wise dimension of the first portion 20. The second portion 21 of cushioned section extends only partially along the width-wise dimension of the backrest portion 12 on each side of the with-wise center of the first portion 20. The second portion 21 of cushioned section extends from the first portion 20 of cushioned section, into the cavity 18, and towards the rear end 17 of the support structure 13. The second portion 21 of cushioned section may comprise chamfered corners 27 which align with corresponding chamfered interior corners in the cavity 18. As is best seen in FIG. 6, the top and bottom longitudinal ends 28, 29 of the cavity 18 is a tapered end such that the cavity 18 tapers away from the user facing side of the backrest portion 12. The second portion 21 of the cushioned section is correspondingly shaped so as to fit within the tapered cavity 18.

In the preferred embodiment shown in the drawings. the cavity 18 extends approximately 303 mm in the width-wise dimension and approximately 530 mm in the lengthwise dimension. The thickness of the second portion 21 of the cushioned section is approximately 100 mm. Consequently, the depth of the cavity 18 is approximately 100 mm to accommodate the second portion 21 of the cushioned section therein. Overall, when the thickness of the first and second portions 20, 21 of cushioning section are combined, the area of localised thickness provided is approximately 150 mm. In the preferred embodiment, the cushioned section 14 comprises a padded cushion 14 formed from materials as would be typically utilised on aircraft seating. The padded cushion 14 may comprise stuffing or padding material within a fabric covering.

Figure 8:
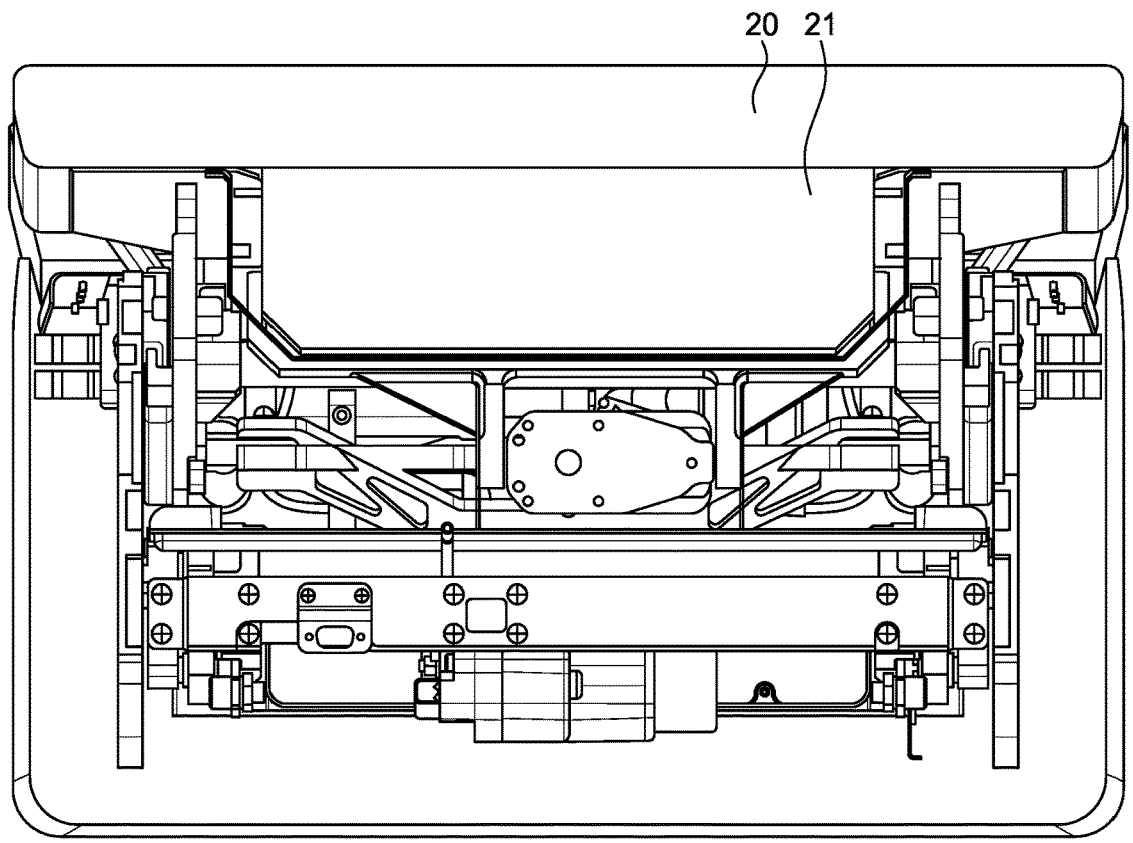
FIG. 8 is a detail sectional view of the vehicle seat of FIG. 4.
Figure 9:
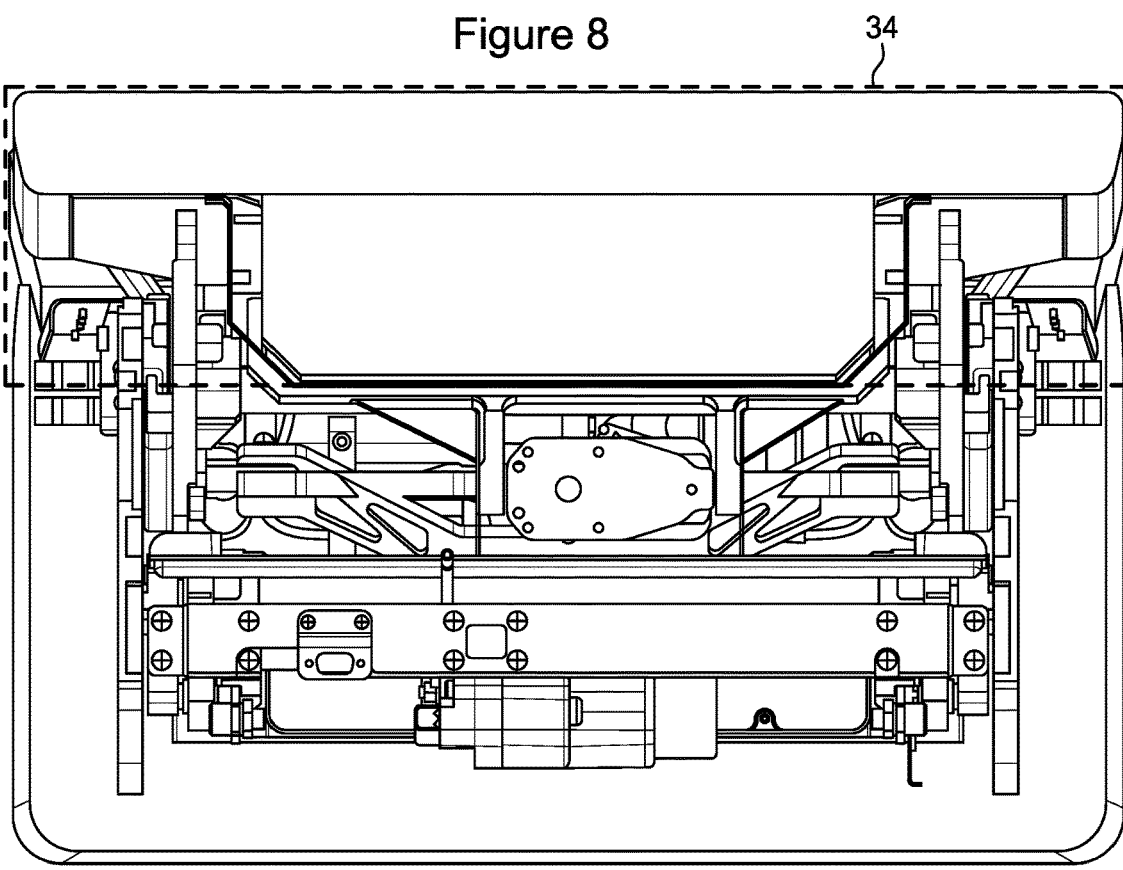
FIG. 9 is a detail sectional view of FIG. 4 showing the area occupied by an equivalent uniform thickness cushioning section.

FIGS. 8 and 9 show a further sectional view showing the cavity and portion 21 of cushioning section located within the cavity. The dashed line 34 on FIG. 9 is added to highlight that to achieve the additional thickness of padding afforded in the area of the cavity, existing designs would need to increase the cushioning thickness across the entire width of the seat, thus increasing the overall depth of the seat, or requiring significant modification to the support structure to accommodate such a seat width thickness increase.

Figure 10:
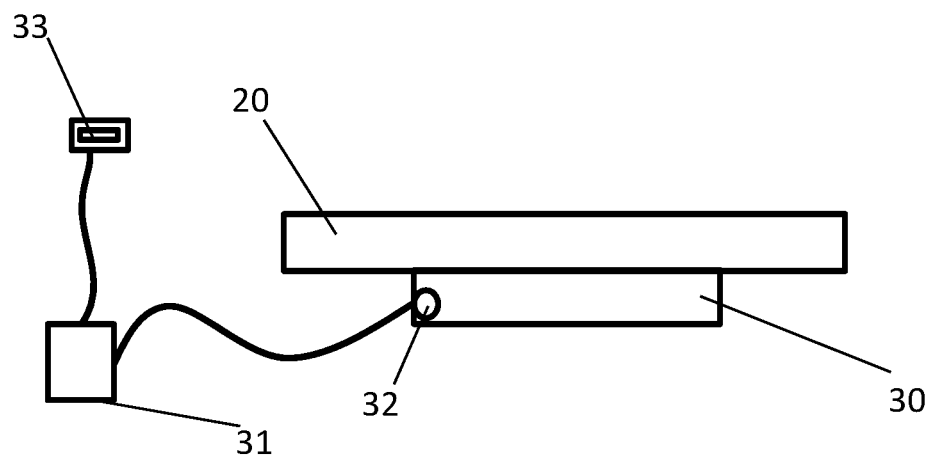
FIG. 10 is a schematic view of a cushioning section of a vehicle seat having an adjustable cushioning section and showing the adjustable cushioning section in a first configuration.
Figure 11:
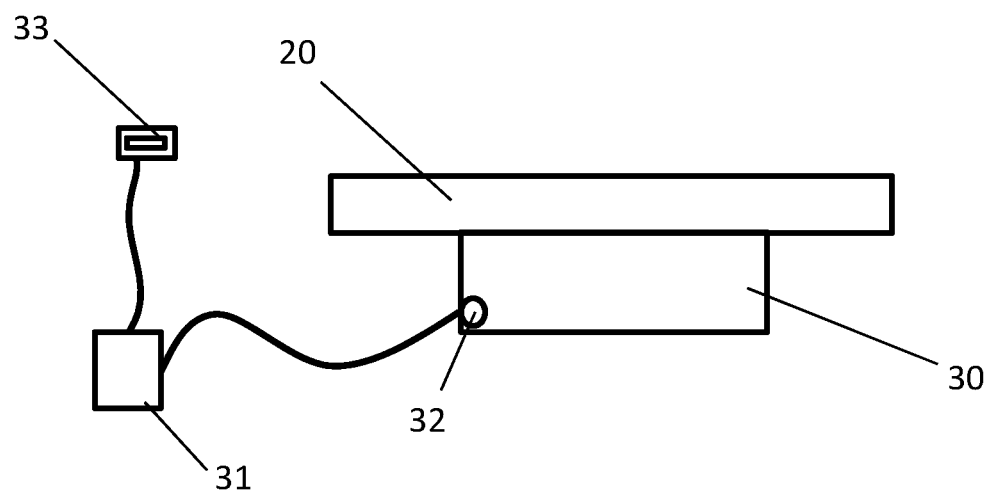
FIG. 11 is a schematic view of the cushioning section of FIG. 10 showing the adjustable cushioning section in a second configuration.

In an alternative embodiment, the cushioning section 14 may further comprise an adjustable cushion section 30, as is best seen in FIGS. 10 and 11. Preferably, the adjustable cushion section 30 may be selectably inflated or deflated to permit adjustment of the level of cushioning felt by a user. FIG. 10 illustrates the adjustable cushioning section in a first configuration wherein it is deflated; FIG. 11 shows the adjustable cushioning section 30 in a second configuration wherein it is inflated. FIGS. 10 and 11 show that the adjustable cushioning section is attached to or in contact with the first portion 20 of the cushioning section, effectively replacing the second portion 21 of the cushioning section. However, it should be understood that the adjustable cushioning section 30 may form a greater or lesser portion of the overall cushioning section 14 as desired, may form part of the first portion 20 of the cushioning section, or may form part of the second portion 21 of the cushioning section. The adjustable cushion section 30 may be a pneumatic cushion 30 which is sized and dimensioned such that, when inflated, it expands from the cavity 18 towards the user facing side of the vehicle seat 10. The pneumatic cushion is in operable engagement with a pneumatic system comprising an air source 31, an air outlet valve 32, and a user operable control 33 arranged to permit user inflation and deflation of the pneumatic cushion 30 via control of the air source 31 and air outlet valve 32. The user operable control 33 may be located in the vehicle seat 10, for example in an arm rest, or may be integrated into a flight entertainment system or the like such that it is operable via a touchscreen thereof. The air source 31, air outlet valve 32, and user operable control 33 may be in wired communication, as is shown in FIGS. 10 and 11, however in alternative arrangements these components may be in wireless communication via wireless communication methods that would be well known to the skilled person. The air source 31 may be an air pump or the like configured to pump air into the pneumatic cushion 30 to inflate the cushion 30 upon a user selecting to inflate said cushion 30 using the user operable control 30. The air outlet valve may be opened, by the user selecting to deflate the pneumatic cushion using the user operable control 33, to allow air to exit the pneumatic cushion thus deflating said cushion 30. Other arrangements are envisioned wherein the air source 31 is capable of both forcing air into the pneumatic cushion 30, and operating in a reverse manner such that may apply suction to actively remove air therefrom. Thus the air outlet valve may not be required in such an arrangement. It is also noted that the pneumatic cushion may be inflated to any intermediate partially inflated configuration between its inflated and deflated configurations, such that a user may obtain optimal comfort levels for their particular needs.

A method of manufacturing the vehicle seat 10 comprises forming the seat base 11 and the backrest portion 12, the backrest portion comprising the support structure 13. A cavity is formed in the support structure for receiving a portion of the cushioned section 14. The cushioned section 14 is formed having a localised area of increased thickness 15, and fitted to the backrest portion such that a portion 21 of the cushioned section 14 is locatable in the cavity 18.

The invention is not limited to the embodiment(s) described herein but can be amended or modified without departing from the scope of the present invention.

The invention claimed is:

1. A vehicle seat comprising a seat base and a backrest portion, wherein the backrest portion comprises:
    a support structure;
    a user engagable cushioned section locatable on a user engagement side of the support structure;
    wherein the support structure is shaped and dimensioned to receive at least a portion of the cushioned section such that the cushioned section comprises at least one localised area of increased thickness located in the area of the shoulder of a user when the user is lying on their side, wherein the support structure is shaped to define a cavity, the cavity defining an opening thereinto from the user facing side of the support structure, at least a portion of the cushioning section extends into the cavity of the support structure to form the localised area of increased thickness, the cavity being shaped and dimensioned such that it does not extend beyond the rearward side of the backrest portion and the presence thereof does not increase the depth of the support structure, and therefore does not increase the overall depth of the backrest portion, and wherein the top and bottom longitudinal end of the cavity is a tapered end such that the cavity tapers away from the user facing side of the backrest portion; and
    wherein the cushioned section comprises a stepped profile when viewed in cross section in the width-wise dimension, the cushioned section comprising a first portion of cushioned section and a second portion of cushioned section, the second portion cushioned section extending from the first portion of cushioned section, such that said second portion is seated further rearwardly into the cavity, the second portion being shaped to conform to the shape of a rearward portion of the cavity, the first and second portions of the cushioned section together forming a generally T-shape cross section.

2. The vehicle seat of claim 1, wherein the cushioned section is sized and dimensioned such that at least a portion thereof extends into the cavity of the support structure to form a localised area of increased thickness.

3. The vehicle seat of claim 1, wherein the cushioned section comprises a plurality of cushioned portions, at least one cushioned portion being sized and dimensioned such that at least a portion thereof extends into the cavity of the support structure to form a localised area of increased thickness.

4. The vehicle seat of claim 1, wherein the vehicle seat is a reclining vehicle seat such that the backrest portion is movable between a seated configuration and a sleeping configuration, the seat base and backrest portion forming a generally flat sleeping surface in sleeping configuration such that a user may adopt a sleeping position, and the cavity is sized and positioned such that the portion of the cushioned section therein provides additional support to the shoulder of a user when sleeping upon their side.

5. The vehicle seat of claim 1, wherein the backrest portion comprises a width-wise dimension which extends, in use, generally across the width of the back of a user, and a lengthwise dimension which extends, in use, generally longitudinally along the back of a user, the cavity being formed centrally in the support structure with respect to the width-wise dimension and extends at least partially along the lengthwise dimension.

6. The vehicle seat of claim 5, wherein the cavity extends along substantially all of the lengthwise dimension of the backrest portion.

7. The vehicle seat of claim 5, wherein the stepped profile comprises the first portion of the cushioned section which extends across the entire width-wise dimension of the backrest portion, and the second portion of cushioned section locatable on a support structure facing side of the first portion and centrally in relation to the width-wise dimension of the first portion, and which extends only partially along the backrest in the width-wise dimension.

8. The vehicle seat of claim 5, wherein the cavity extends approximately 250-350 mm in the widthwise dimension.

9. The vehicle seat of claim 5, wherein the cavity extends approximately 500-600 mm in the lengthwise dimension.

10. The vehicle seat of claim 1, wherein the cushioned section comprises a padded cushion.

11. The vehicle seat of claim 10, wherein the cushioned section may further comprise an adjustable cushion section which may be selectably inflated or deflated to permit adjustment of the level of cushioning felt by a user.

12. The vehicle seat of claim 11, wherein the adjustable cushion section is a pneumatic cushion which is sized and dimensioned such that, when inflated, it expands from the cavity towards the user facing side of the vehicle seat.

13. The vehicle seat of claim 12, wherein the pneumatic cushion is in operable engagement with a pneumatic system comprising an air source, an air outlet valve, and a user operable control arranged to permit user inflation and deflation of the pneumatic cushion via control of the air source and air outlet valve.

14. The vehicle seat of claim 1 wherein the vehicle seat is a reclining aircraft passenger seat.

15. A method of manufacturing a vehicle seat comprising the steps of:
providing a seat base and a backrest portion, the backrest portion comprising a support structure shaped and sized to receive at least a portion of a cushioning section;
forming a cushioning section having a localised area of increased thickness corresponding to the area of the shoulder of a user when the user is lying on their side;
fitting the cushioned section to a user facing side of the support structure such that at least a portion of the cushioning section is received by the support structure; and
shaping the support structure to define a cavity, the cavity defining an opening thereinto from the user facing side of the support structure, at least a portion of the cushioning section extends into the cavity of the support structure to form the localised area of increased thickness, the cavity being shaped and dimensioned such that it does not extend beyond the rearward side of the backrest portion and the presence thereof does not increase the depth of the support structure, and therefore does not increase the overall depth of the backrest portion, and;
tapering the top and bottom longitudinal end of the cavity such that the cavity tapers away from the user facing side of the backrest portion; and
providing the cushioned section with a stepped profile when viewed in cross section in the width-wise dimension, the cushioned section comprising a first portion of cushioned section and a second portion of cushioned section, the second portion cushioned section extending from the first portion of cushioned section, such that said second portion is seated further rearwardly into the cavity, the second portion being shaped to conform to the shape of a rearward portion of the cavity, the first and second portions of the cushioned section together forming a generally T-shape cross section.

16. The method of manufacturing a vehicle seat according to claim 15, further comprising the steps of:
forming the support structure comprising a cavity in a user facing side thereof; and
fitting the cushioning section to the user facing side of the support structure such that at least a portion of the cushioned section extends into the cavity of the support structure.

* * * * *